(12) United States Patent
Kimura

(10) Patent No.: US 8,830,502 B2
(45) Date of Patent: Sep. 9, 2014

(54) MASTER MANAGEMENT SERVER, CACHE MANAGEMENT SERVER, AND PRINT DOCUMENT INFORMATION MANAGEMENT SYSTEM

(75) Inventor: Mitsuo Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 12/942,859

(22) Filed: Nov. 9, 2010

(65) Prior Publication Data

US 2011/0134472 A1     Jun. 9, 2011

(30) Foreign Application Priority Data

Dec. 9, 2009    (JP) ................................. 2009-279728

(51) Int. Cl.
    *G06F 3/12*    (2006.01)
(52) U.S. Cl.
    CPC ............ *G06F 3/1288* (2013.01); *G06F 3/1203* (2013.01); *G06F 3/1267* (2013.01)
    USPC ....... 358/1.15; 358/1.12; 358/1.13; 358/1.16; 361/690; 709/201; 709/220
(58) Field of Classification Search
    None
    See application file for complete search history.

(56) References Cited

U.S. PATENT DOCUMENTS

| 7,382,483 | B2 * | 6/2008 | Muranaka | 358/1.15 |
| 7,911,786 | B2 * | 3/2011 | Sano et al. | 361/690 |
| 8,427,674 | B2 * | 4/2013 | Sato | 358/1.15 |
| 2008/0030792 | A1 * | 2/2008 | Shiiyama | 358/402 |
| 2009/0174897 | A1 * | 7/2009 | Sato | 358/1.15 |

FOREIGN PATENT DOCUMENTS

JP    2002-007441 A    1/2002

* cited by examiner

*Primary Examiner* — Ashish K Thomas
(74) *Attorney, Agent, or Firm* — Carter, DeLuca, Farrell & Schmidt, LLP

(57) ABSTRACT

A master management server for managing print document information in a master includes an acquisition unit configured to acquire a disposal reference date from a system management server for managing a date used as a reference date in disposal processing of print document information, and a master management unit configured to, if the acquired disposal reference date differs from an executed disposal reference date retained in the master management server, perform disposal processing in which print document information is deleted or is set as a non-target for printing, based on the acquired disposal reference date, and transmit a cache update request, containing print document information for which disposal has been suspended in the disposal processing and the disposal reference date used in the disposal processing, to a cache management server for managing cache of a group identified by group identification information contained in the print document information.

12 Claims, 17 Drawing Sheets

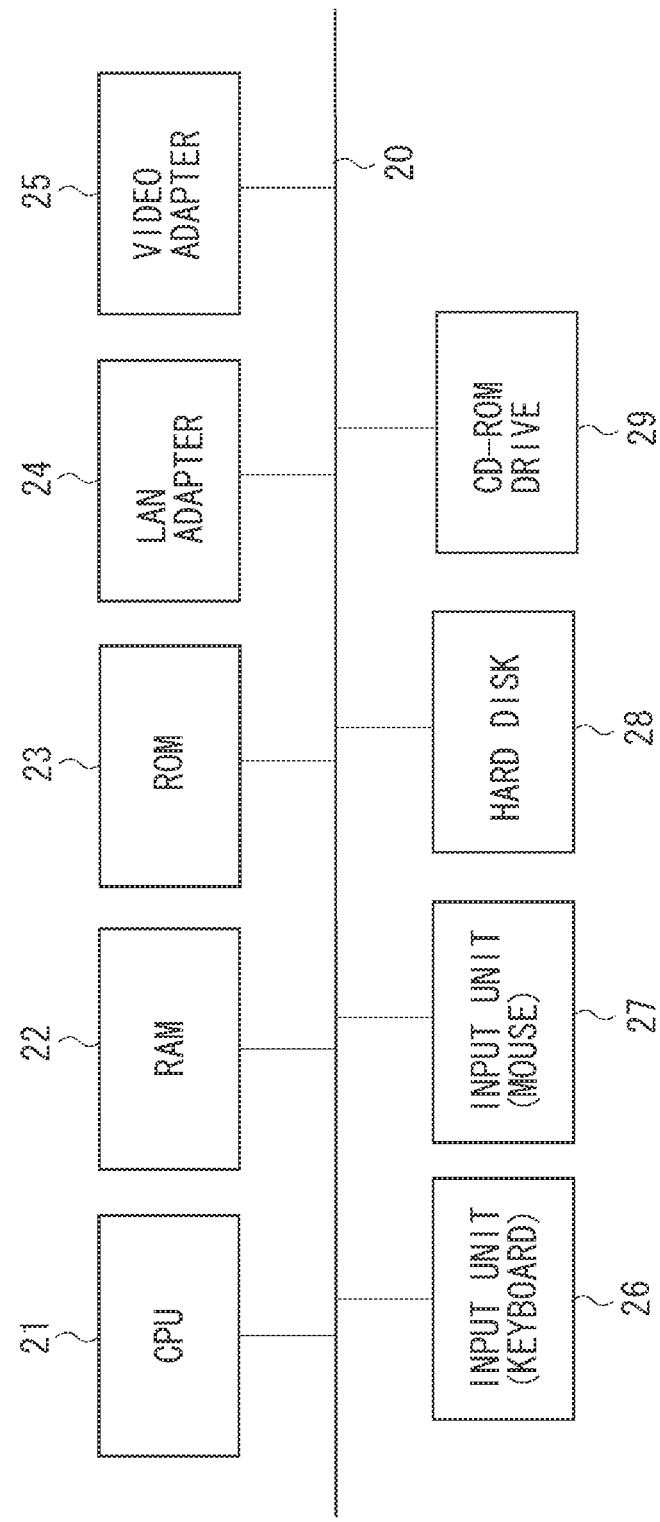

1301

| DOCUMENT NAME | STATUS | PRINTABLE EXPIRATION DATE | STORAGE EXPIRATION DATE |
|---|---|---|---|
| DOCUMENT 1 | DELETED | 2009/11/8 | 2009/11/9 |
| DOCUMENT 2 | PRINTING | 2009/11/9 | 2009/11/9 |
| DOCUMENT 3 | PRINTED | 2009/11/9 | 2009/11/10 |
| DOCUMENT 4 | PRINTING | 2009/11/9 | 2009/11/10 |
| DOCUMENT 5 | STANDBY | 2009/11/10 | 2009/11/10 |

1302

| DOCUMENT NAME | STATUS | PRINTABLE EXPIRATION DATE | STORAGE EXPIRATION DATE |
|---|---|---|---|
| DOCUMENT 2 | PRINTING | 2009/11/9 | 2009/11/9 |
| DOCUMENT 3 | DELETED | 2009/11/9 | 2009/11/10 |
| DOCUMENT 4 | PRINTING | 2009/11/9 | 2009/11/10 |
| DOCUMENT 5 | STANDBY | 2009/11/10 | 2009/11/10 |

| DOCUMENT NAME | STATUS | PRINTABLE EXPIRATION DATE | STORAGE EXPIRATION DATE |
|---|---|---|---|
| DOCUMENT 1 | DELETED | 2009/11/8 | 2009/11/9 |
| DOCUMENT 2 | PRINTING | 2009/11/9 | 2009/11/9 |
| DOCUMENT 3 | PRINTED | 2009/11/9 | 2009/11/10 |
| DOCUMENT 4 | PRINTING | 2009/11/9 | 2009/11/10 |
| DOCUMENT 5 | STANDBY | 2009/11/10 | 2009/11/10 |

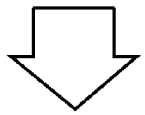

1402

| DOCUMENT NAME | STATUS | PRINTABLE EXPIRATION DATE | STORAGE EXPIRATION DATE |
|---|---|---|---|
| DOCUMENT 3 | DELETED | 2009/11/9 | 2009/11/10 |
| DOCUMENT 4 | DELETED | 2009/11/9 | 2009/11/10 |
| DOCUMENT 5 | STANDBY | 2009/11/10 | 2009/11/10 |

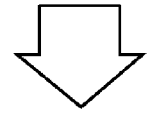

1403

| DOCUMENT NAME | STATUS | PRINTABLE EXPIRATION DATE | STORAGE EXPIRATION DATE |
|---|---|---|---|
| DOCUMENT 2 | PRINTING | 2009/11/9 | 2009/11/9 |
| DOCUMENT 3 | DELETED | 2009/11/9 | 2009/11/10 |
| DOCUMENT 4 | PRINTING | 2009/11/9 | 2009/11/10 |
| DOCUMENT 5 | STANDBY | 2009/11/10 | 2009/11/10 |

| DOCUMENT NAME | STATUS | PRINTABLE EXPIRATION DATE | STORAGE EXPIRATION DATE |
|---|---|---|---|
| DOCUMENT 1 | DELETED | 2009/11/8 | 2009/11/9 |
| DOCUMENT 2 | PRINTING | 2009/11/9 | 2009/11/9 |
| DOCUMENT 3 | PRINTED | 2009/11/9 | 2009/11/10 |
| DOCUMENT 4 | PRINTING | 2009/11/9 | 2009/11/10 |
| DOCUMENT 5 | STANDBY | 2009/11/10 | 2009/11/10 |

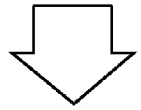

1502

| DOCUMENT NAME | STATUS | PRINTABLE EXPIRATION DATE | STORAGE EXPIRATION DATE |
|---|---|---|---|
| DOCUMENT 1 | DELETED | 2009/11/8 | 2009/11/9 |
| DOCUMENT 2 | PRINTING | 2009/11/9 | 2009/11/9 |
| DOCUMENT 3 | PRINTED | 2009/11/9 | 2009/11/10 |
| DOCUMENT 4 | CANCELLED | 2009/11/9 | 2009/11/10 |
| DOCUMENT 5 | PRINTING | 2009/11/10 | 2009/11/10 |

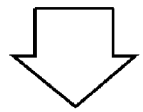

1503

| DOCUMENT NAME | STATUS | PRINTABLE EXPIRATION DATE | STORAGE EXPIRATION DATE |
|---|---|---|---|
| DOCUMENT 2 | PRINTING | 2009/11/9 | 2009/11/9 |
| DOCUMENT 3 | DELETED | 2009/11/9 | 2009/11/10 |
| DOCUMENT 4 | DELETED | 2009/11/9 | 2009/11/10 |
| DOCUMENT 5 | PRINTING | 2009/11/10 | 2009/11/10 |

| DOCUMENT NAME | STATUS | PRINTABLE EXPIRATION DATE | STORAGE EXPIRATION DATE |
|---|---|---|---|
| DOCUMENT 1 | DELETED | 2009/11/8 | 2009/11/9 |
| DOCUMENT 2 | PRINTING | 2009/11/9 | 2009/11/9 |
| DOCUMENT 3 | PRINTED | 2009/11/9 | 2009/11/10 |
| DOCUMENT 4 | PRINTING | 2009/11/9 | 2009/11/10 |
| DOCUMENT 5 | STANDBY | 2009/11/10 | 2009/11/10 |

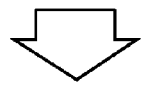

1602

| DOCUMENT NAME | STATUS | PRINTABLE EXPIRATION DATE | STORAGE EXPIRATION DATE |
|---|---|---|---|
| DOCUMENT 3 | DELETED | 2009/11/9 | 2009/11/10 |
| DOCUMENT 4 | DELETED | 2009/11/9 | 2009/11/10 |
| DOCUMENT 5 | STANDBY | 2009/11/10 | 2009/11/10 |

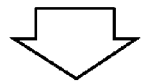

1603

| DOCUMENT NAME | STATUS | PRINTABLE EXPIRATION DATE | STORAGE EXPIRATION DATE |
|---|---|---|---|
| DOCUMENT 3 | DELETED | 2009/11/9 | 2009/11/10 |
| DOCUMENT 4 | DELETED | 2009/11/9 | 2009/11/10 |
| DOCUMENT 5 | PRINTING | 2009/11/10 | 2009/11/10 |

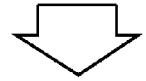

1604

| DOCUMENT NAME | STATUS | PRINTABLE EXPIRATION DATE | STORAGE EXPIRATION DATE |
|---|---|---|---|
| DOCUMENT 2 | PRINTING | 2009/11/9 | 2009/11/9 |
| DOCUMENT 3 | DELETED | 2009/11/9 | 2009/11/10 |
| DOCUMENT 4 | DELETED | 2009/11/9 | 2009/11/10 |
| DOCUMENT 5 | PRINTING | 2009/11/10 | 2009/11/10 |

MASTER MANAGEMENT SERVER, CACHE MANAGEMENT SERVER, AND PRINT DOCUMENT INFORMATION MANAGEMENT SYSTEM

BACKGROUND OF THE INVENTION

1. Field of the Invention

The present invention relates to a master management server, a cache management server, and a print document information management system.

2. Description of the Related Art

Print document information management systems that manage document data to be printed and printers for printing such data are conventionally known. A print document information management system receives document data from a user application or from another document management system, generates print document information, and associates the print document information with the document data before storing the print document information. In response to a user request for a list of print documents, the print document information management system returns a list of print document information, and displays the list on the user's terminal. According to a user request for printing, the print document information management system performs printing processing, and reflects the progress and result of the printing processing in the print document information.

Print document information management systems can set access rights for print documents that the print document information management systems manage. When a print document information management system receives a user request for a list of print documents, the print document information management system identifies the user who made the request, and returns information only on the print documents to which the user has been granted access. In response to a user request for printing, the print document information management system also allows or denies the request according to the setting of an access right.

Furthermore, a print document information management system can set storage expiration dates and printable expiration dates for respective print documents. For print documents whose printable expiration date has passed, the print document information management system sets a non-printable status and denies user requests to print those documents. The print document information management system deletes print documents whose storage expiration date has passed from the print document information management system. The term "disposal processing on print documents", as used herein, means processing in which a print document information management system finds print documents whose storage expiration date or printable expiration date has passed and processes those documents once a day.

A print document information management system usually manages information on print documents in a database, and searches the database to generate a list of print documents to be returned to a user. The information on print documents stored in the database is frequently updated because the information on print documents reflects the progress and result of printing processing in real time. Thus, print document information management systems are provided with master databases used for updating purposes and cache databases used for reference purposes. Each time information in the master databases is updated, the print document information management system asynchronously notifies the cache databases of the update information, so that the master databases reflect the update information. The cache databases are not necessarily in a one-to-one correspondence with the master databases, and the databases do not necessarily have the same structure. For example, multiple cache databases may be provided for each master database to achieve load distribution. This enables the number of users who can make reference to increase. Cache databases may also be built with consideration given to lists of print documents returned to users. For example, when users belong to multiple groups, and print documents of the users belonging to each group are desired to be referenced, the cache databases may be built so that the print documents of the users belonging to each group are collected in advance.

In recent years, the penetration of the Internet and the emergence of high-speed networks have allowed an increasing number of functions that were used to be provided as software to be offered as services on the Internet. As the back-end of such services, a print document information management system may serve. In that case, the print document information management system is required to manage an incomparably larger amount of print documents than ever before. In the print document information management system managing such a large amount of print documents, tens of thousands of master databases and cache databases manage the print documents in a distributed manner. When the print document information management system performs disposal processing, an enormous amount of information on print documents is updated, resulting in generation of a large volume of update information of which the cache databases are to be notified. This puts the entire print document information management system under heavy load. For example, assume a case in which each master database performs disposal processing on 100,000 print documents. In this case, update information for the product of 100,000 print documents and the number of master databases flows through the network. In a system configuration that includes multiple cache databases for each master database, the amount of update information flowing through the network can be still many times larger.

To address this problem, Japanese Patent Application Laid-Open No. 2002-007441 describes a system in which a deletion table and an addition table are generated. When a master database is updated, deleted records are registered in the deletion table, and added records are registered in the addition table. These are sent as compressed files to a location where cache databases are managed.

However, in the method described in Japanese Patent Application Laid-Open No. 2002-007441, after updating of the master database is completed, all pieces of update information are simultaneously transmitted to the location where the cache databases are managed. Then, updating of the cache databases is started. Thus, in processing, such as disposal processing, in which a large volume of information is updated at a time, it takes a long time to reach the completion of the updating of the cache databases. For example, when execution of disposal is supposed to be accomplished by batch processing performed during nighttime hours, the disposal processing on the entire system may not be completed by the next morning, causing inconvenience to the conduct of the business on the next day.

SUMMARY OF THE INVENTION

The present invention is directed to a method for enabling efficient and consistent disposal processing on print documents whose printable expiration date, storage expiration date, or other expiration date has passed, while reducing the load on an entire system.

According to an aspect of the present invention, a master management server for managing print document information in a master includes an acquisition unit configured to acquire a disposal reference date from a system management server for managing a date used as a reference date in disposal processing of print document information, and a master management unit configured to, if the disposal reference date acquired by the acquisition unit differs from an executed disposal reference date retained in the master management server, perform disposal processing in which print document information is deleted or is set as a non-target for printing, based on the disposal reference date acquired by the acquisition unit, and transmit a cache update request, containing print document information for which disposal has been suspended in the disposal processing and the disposal reference date used in the disposal processing, to a cache management server for managing cache of a group identified by group identification information contained in the print document information.

According to another aspect of the present invention, a cache management server for print document information in a cache includes an acquisition unit configured to acquire a disposal reference date from a system management server for managing a date used as a reference date in disposal processing of print document information, and a cache management unit configured to, if the disposal reference date acquired by the acquisition unit differs from an executed disposal reference date retained in the cache management server, perform disposal processing in which print document information is deleted or is set as a non-target for printing, based on the disposal reference date acquired by the acquisition unit, and upon receipt of a cache update request containing print document information and a disposal reference date from a master management server for managing print document information in a master, compare the disposal reference date contained in the cache update request with the disposal reference date used in the disposal processing, and depending on a result of the comparison, determine whether to reflect the print document information contained in the cache update request in print document information in the cache managed by the cache management server.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example hardware configuration of terminals, servers and other components.

FIG. 14 illustrates changes in the print document information (cache) before and after disposal processing with respect to the print document information (master) illustrated in FIG. 13.

FIG. 15 illustrates changes in the print document information (master) subjected to disposal processing after user operation.

FIG. 16 illustrates changes in the print document information (cache) with respect to the print document information (master) illustrated in FIG. 15 before and after disposal processing and when update requests from the master management server are reflected.

DESCRIPTION OF THE EMBODIMENTS

Various exemplary embodiments, features, and aspects of the invention will be described in detail below with reference to the drawings.

Figure 1:
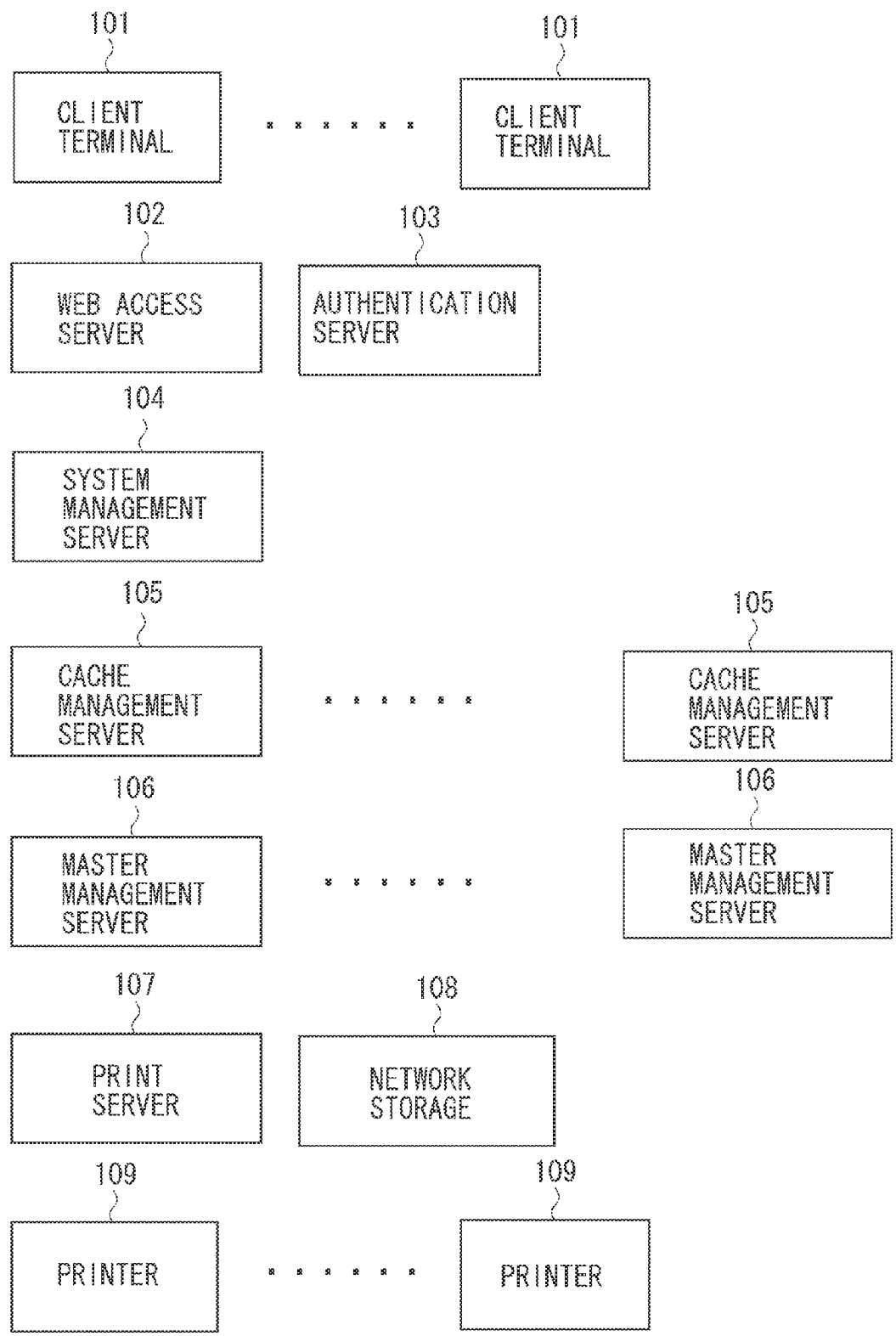
FIG. 1 illustrates an example system configuration of a print document information management system.

First, a print document information management system (hereinafter referred to simply as a "system") will be described. FIG. 1 illustrates an example configuration of a system. The system includes client terminals 101, a web access server 102, an authentication server 103, a system management server 104, cache management servers 105, master management servers 106, a print server 107, a network storage 108, and printers 109. These components of the system are connected via a communication line (not shown). In the example configuration in FIG. 1, it is assumed that multiple client terminals 101, multiple cache management servers 105, multiple master management servers 106, and multiple printers 109 are connected to the system.

The communication line is a communication network realized by, for example, the Internet, an intranet, such as a LAN and a WAN, a telephone line, a dedicated digital line, an ATM, a frame relay line, a cable television line, and a data broadcast wireless line, alone or in any combination thereof. Any communication line capable of sending and receiving data may be used. Communications from the client terminals 101 to the web access server 102, from the print server 107 to the network storage 108 and the printers 109, and among the servers may be achieved in different manners.

The client terminals 101 include, for example, a desktop personal computer(s), a notebook computer(s), a mobile personal computer(s), a personal digital assistant (s) (PDA(s)), and/or other devices. The client terminals 101 may also be cellular phones including a program execution environment.

The web access server 102 receives requests from the client terminals 101 and returns responses. The web access server 102 also acquires cached print document information from the cache management servers 105 to generate, from the print document information, web pages to be returned to the client terminals 101.

The authentication server 103, which supports a protocol such as LDAP to provide directory services, manages user information in this system. When the authentication server 103 receives a request from the web access server 102, the authentication server 103 performs user authentication and returns authentication information.

When the print server 107 receives a request for printing, the print server 107 reads print document data stored in the network storage 108, converts the read data into a format interpretable by the printer 109, and sends the data. The print server 107 also monitors the print job of the printer 109 and tracks the print job until the printing is completed.

The network storage 108 is storage, such as a storage area network (SAN) or network-attached storage (NAS), that is directly connectable to the network. The network storage 108 stores print document data associated with print document information. The printers 109 are those (e.g., laser printers) connectable to the network.

FIG. 2 illustrates an example hardware configuration of the terminals, servers and other components. The terminals, servers and other components include, for example, the client terminals 101, the web access server 102, the authentication server 103, the system management server 104, the cache management servers 105, the master management servers 106, the print server 107, the network storage 108, and the like.

In FIG. 2, a CPU 21, RAM 22, a LAN adapter 24, a video adapter 25, an input unit (keyboard) 26, an input unit (mouse) 27, a hard disk 28, and a CD-ROM drive 29 are connected to each other via a system bus 20. The system bus 20 may include, for example, a PCI bus, an AGP bus, and/or a memory bus. In FIG. 2, connection chips between buses, keyboard interfaces, and input/output interfaces, such as so-called SCSI and ATAPI interfaces, are not illustrated.

The CPU 21 performs various calculations, such as arithmetic operations and comparison operations, and hardware control according to operating system programs and application programs.

The RAM 22 stores operating system programs, application programs, and other programs read from the hard disk 28 and from a storage medium, such as a CD-ROM or a CD-R, mounted on the CD-ROM drive 29. The CPU 21 executes these programs.

The ROM 23 stores, for example, so-called BIOS that controls input/output of data to/from, e.g., the hard disk 28 in cooperation with the operating system.

The LAN adapter 24 communicates with an external device connected via a network in cooperation with the communication program of the operating system controlled by the CPU 21.

The video adapter 25 generates an image signal output to a display apparatus. The keyboard 26 and the mouse 27 are used to input instructions to the client terminals 101.

The hard disk 28 stores the operating system and application programs (for example, programs of the system according to the present exemplary embodiment).

The CD-ROM drive 29 is used to mount a storage medium, such as a CD-ROM, CD-R, or CD-R/W, to install application programs in the hard disk 28. In place of the CD-ROM drive 29, a CD-R drive, a CD-R/W drive, a DVD drive, or other drive may also be used. The functions of the terminals or servers (or software configuration) are implemented by execution of programs by the CPU 21.

Figure 3A:
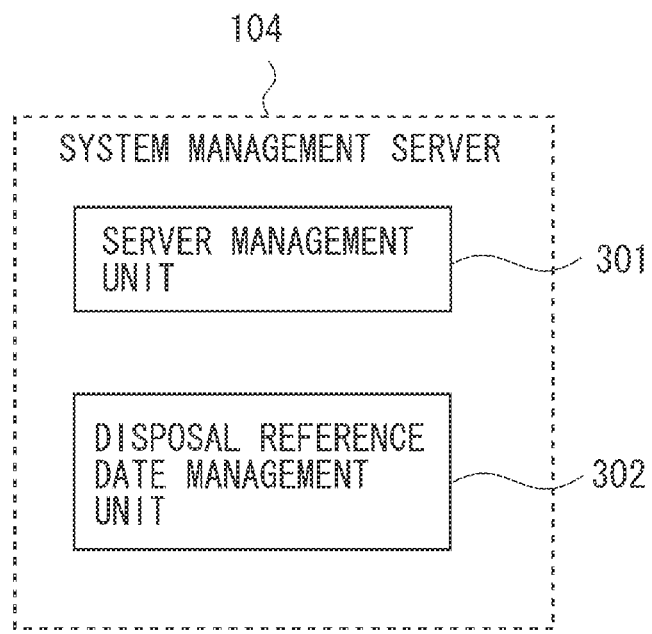
FIG. 3A illustrates an example software configuration of a system management server.

FIG. 3A illustrates an example software configuration of the system management server 104. The system management server 104 includes a server management unit 301. The server management unit 301 receives regular polling from the master management servers 106 and the cache management servers 105, and manages the operating status of each server. The system management server 104 further includes a disposal reference date management unit 302. The disposal reference date management unit 302 retains a disposal reference date and updates the disposal reference date once a day at a predetermined time. The disposal reference date is a reference date for disposal processing performed by the master management servers 106 and the cache management servers 105. For example, when the disposal reference date is Oct. 10, 2009, print documents whose printable expiration date or storage expiration date is prior to Oct. 9, 2009 or is Oct. 9, 2009 are subjected to disposal processing. In response to regular inquiries from the master management servers 106 and the cache management servers 105, the disposal reference date management unit 302 returns a disposal reference date retained therein.

Figure 3B:
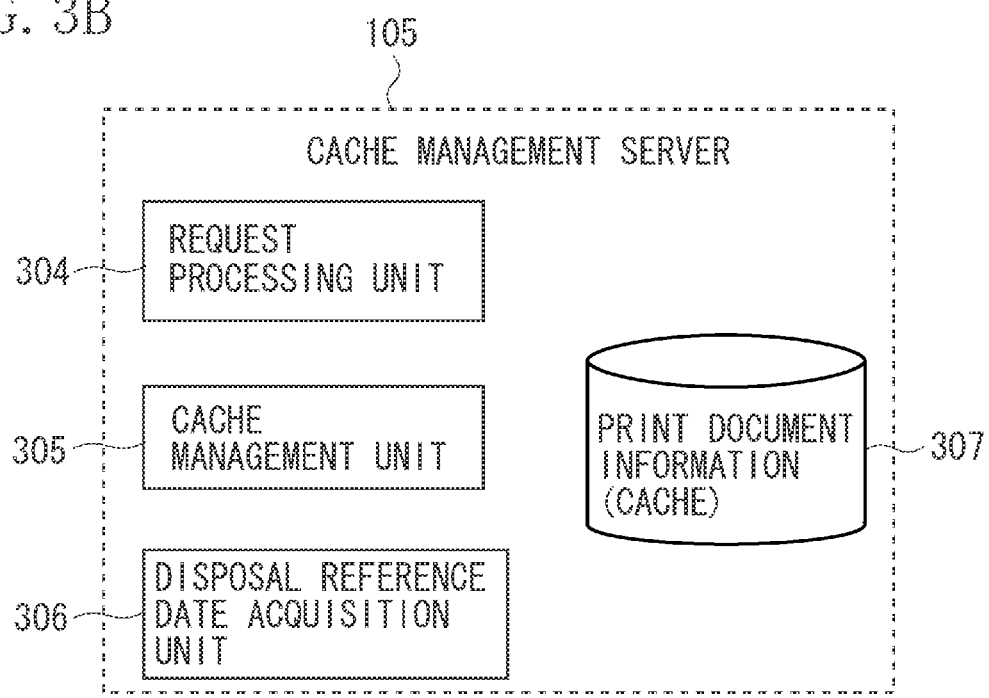
FIG. 3B illustrates an example software configuration of a cache management server.

FIG. 3B illustrates an example software configuration of the cache management servers 105. Each cache management server 105 includes a request processing unit 304 that receives requests from the web access server 102 and returns responses. The request processing unit 304 also receives requests from the master management servers 106. Each cache management server 105 further includes a cache management unit 305 that manages print document information (cache) 307 for each group. The cache management servers 105 manage the print document information (cache) 307 for the respective groups in a distributed manner. Each cache management server 105 further includes a disposal reference date acquisition unit 306 that provides a live-status confirmation to the system management server 104 at regular time intervals to acquire a disposal reference date.

Figure 3C:
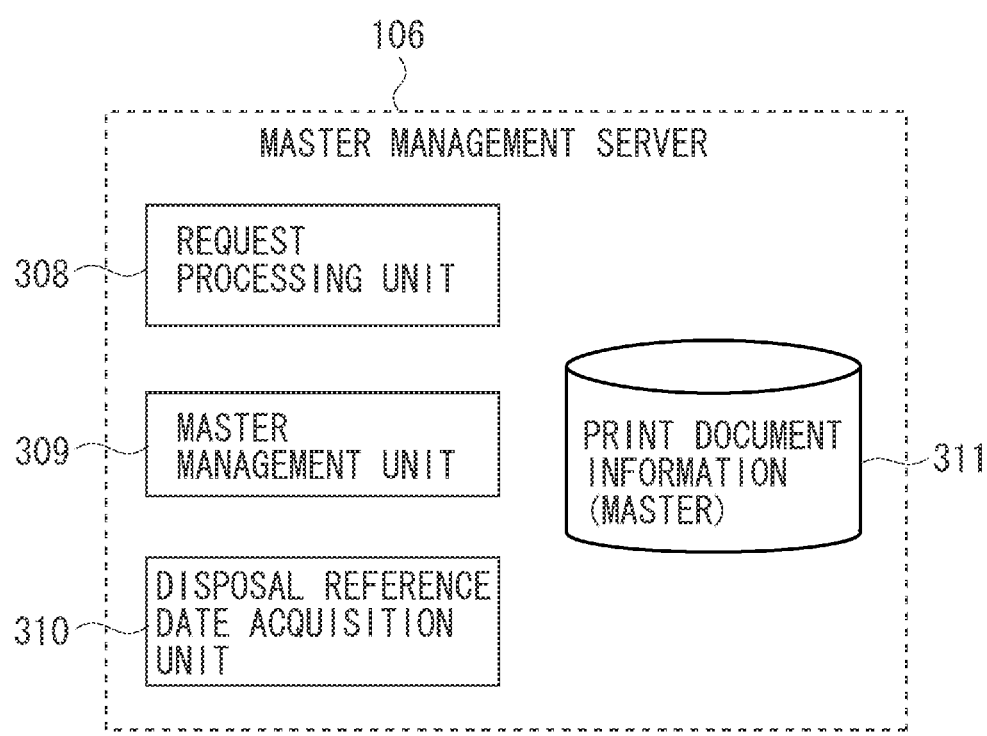
FIG. 3C illustrates an example software configuration of a master management server.

FIG. 3C illustrates an example software configuration of the master management servers 106. Each master management server 106 includes a request processing unit 308 that receives requests from the cache management servers 105 and returns responses. The request processing unit 308 also receives requests from the print server 107. Each master management server 106 further includes a master management unit 309 that manages print document information (master) 311 for each owner. The master management servers 106 manage the print document information (master) 311 for respective owners in a distributed manner. Each master management server 106 further includes a disposal reference date acquisition unit 310 that provides a live-status confirmation to the system management server 104 at regular time intervals to acquire a disposal reference date.

Figure 4:
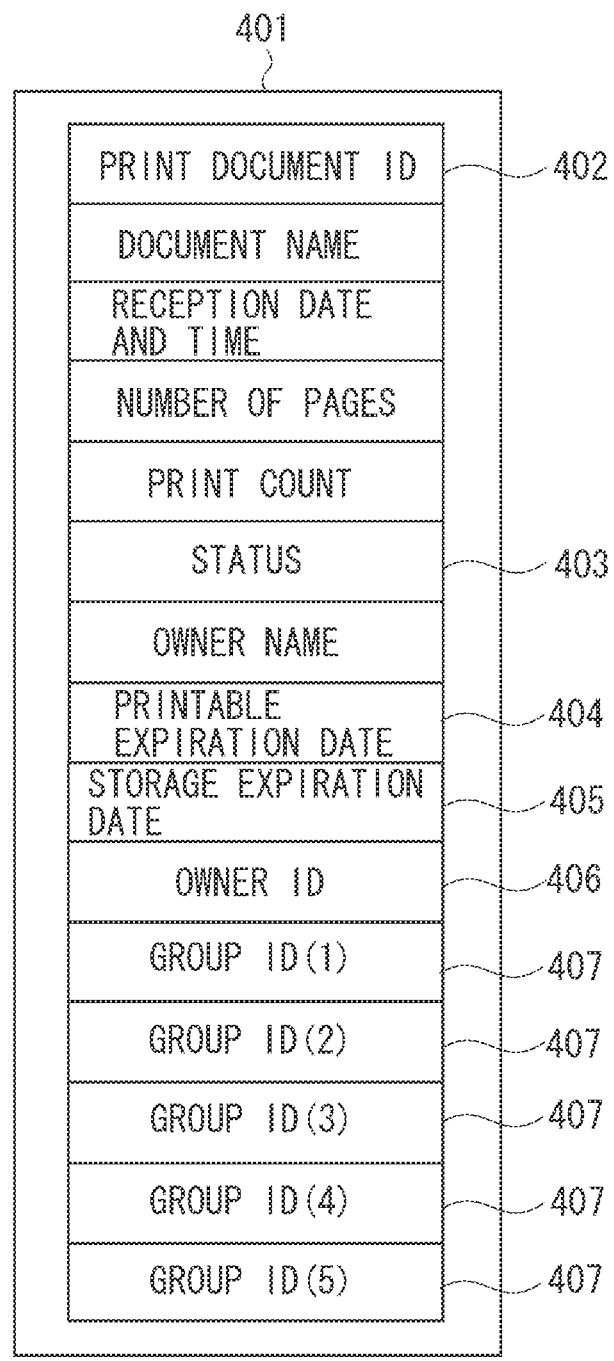
FIG. 4 illustrates an example of print document information contained in print document information (master) and in print document information (cache).

FIG. 4 illustrates an example of print document information 401 contained in the print document information (master) 311 and in the print document information (cache) 307. The print document information 401 contains a print document ID 402 used to identify a print document, a document name, and the number of pages. The print document information 401 further contains reception date and time indicating the date and time of the registration of the print document. The print document information 401 also contains a print count that is incremented each time printing is performed. The print document information 401 further contains a status 403 that reflects the progress of printing processing when printing is performed. When printing is performed, the status 403 changes from "standby" to "waiting for printing", and to "printing", and is finally set to either "completed" or "error quit" depending on the result of the printing processing. When printing processing has been aborted according to a user's instruction, the status 403 is set to "canceled". When the print document has been deleted according to a user's instruction or when the printable expiration date thereof has passed, the status 403 is set to "deleted".

The print document information 401 further contains an owner name indicating a user who registered the print document with the system. The print document information 401 also contains a printable expiration date 404 and a storage expiration date 405. The print document information 401 further contains, as an owner ID 406, a user ID of the user who registered the print document. The print document information 401 further contains group IDs 407. The group IDs 407 are an example of group identification information that is used to identify groups to which the user who registered the print document belongs.

Figure 5A:
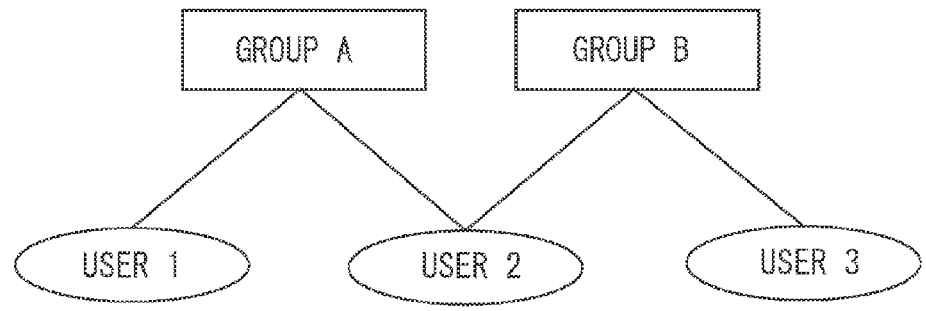
FIG. 5A illustrates an example of users and groups.
Figure 5B:
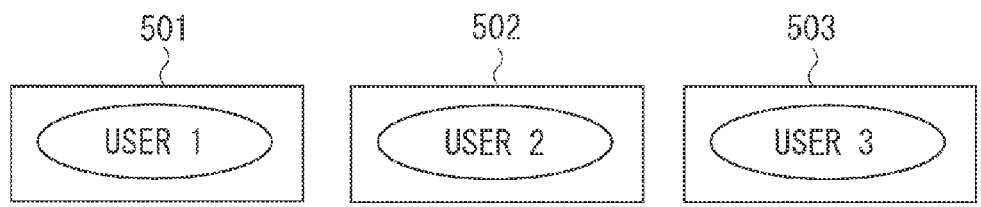
FIG. 5B illustrates the configuration of the print document information (master) managed by the master management server.
Figure 5C:
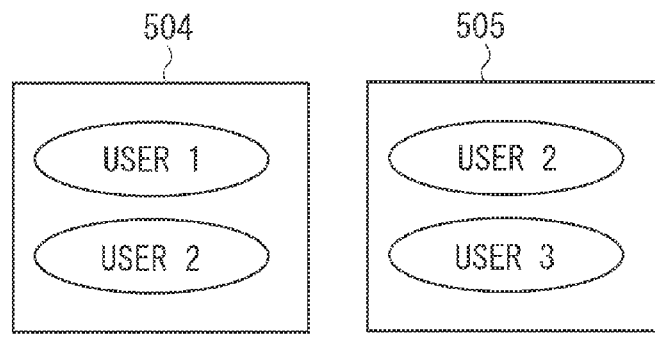
FIG. 5C illustrates the configuration of the print document information (cache) managed by the cache management server.

FIGS. 5A to 5C illustrate examples of print document information managed by the cache management servers 105 and the master management servers 106.

FIG. 5A illustrates that a user 1 and a user 2 belong to a group A, and the user 2 and a user 3 belong to a group B.

FIG. 5B illustrates the configuration of the print document information (master) 311 managed by the master management servers 106. The print document information (master) 311, managed for the respective owners (the respective users who registered print documents), contains print document information lists 501, 502, and 503 in which the owners are the users 1, 2, and 3, respectively. The print document information (master) 311, which is divided for the respective owners, can be managed by the master management servers 106 in a distributed manner.

FIG. 5C illustrates the configuration of the print document information (cache) 307 managed by the cache management servers 105. The print document information (cache) 307, managed for the respective groups to which the users who registered print documents belong, includes print document information lists 504 and 505 in which the owners are the users belonging to the groups A and B, respectively. The print document information list 504 contains print document information 401 in which the users 1 and 2 belonging to the group A are the owners. The print document information list 505 contains print document information 401 in which the users 2 and 3 belonging to the group B are the owners. The print document information (cache) 307, configured for the respective groups to which the users who registered print documents belong, can be managed by the cache management servers 105 in a distributed manner.

Figure 6:
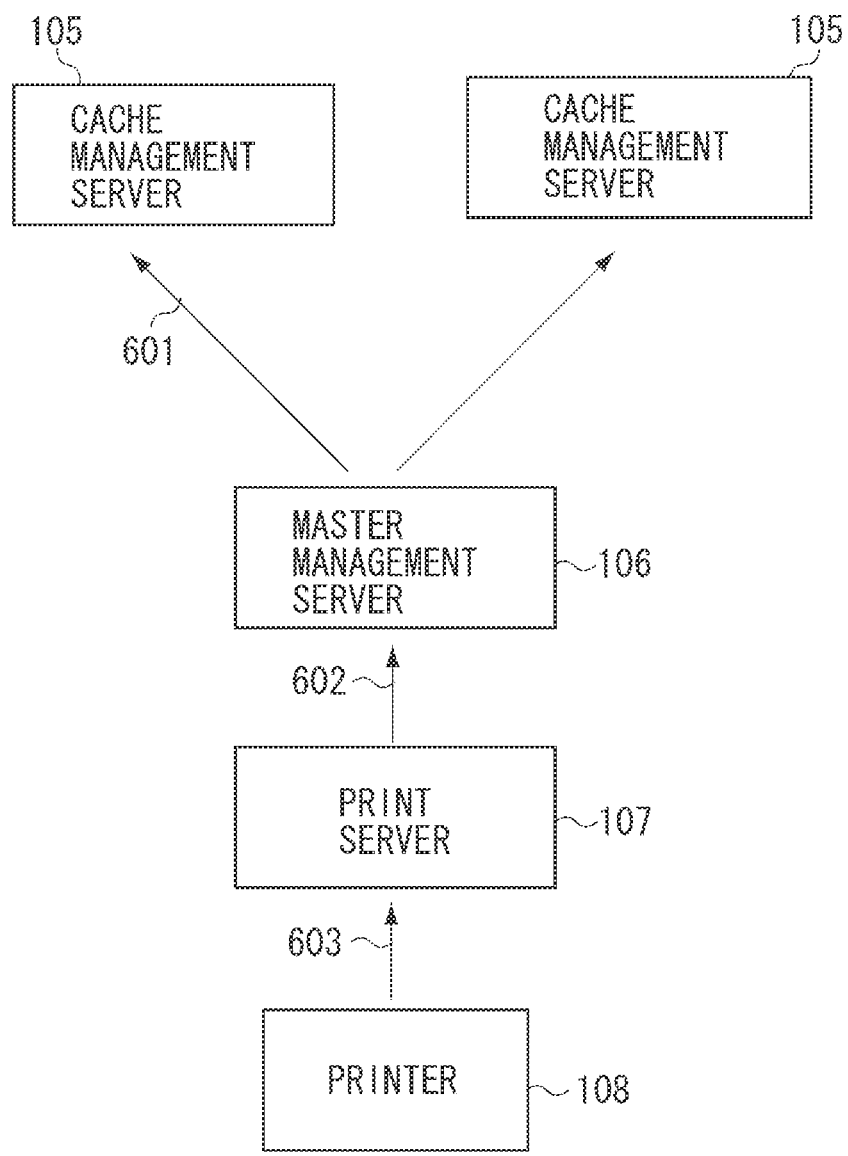
FIG. 6 illustrates a process flow when a print server for monitoring a print job being performed by a printer is notified by the printer of a change in the status of the print job.

FIG. 6 illustrates a process flow when the print server 107 monitoring a print job being performed by a printer 109 is notified by the printer 109 of a change in the status of the print job. When the print server 107 receives a print-job status change notification 603 from the printer 109, the print server 107 transmits an update request 602 to a master management server 106. The update request 602 contains an ID used to identify the print document. Upon receipt of the request, the master management server 106 updates the print document information (master) 311. The master management server 106 transmits a cache update request 601 to all cache management servers 105 managing the print document information (cache) 307 having group IDs contained in the updated print document information (master) 311. The cache update request 601 contains a disposal reference date (which will be described later) in addition to the updated print document information 401 and the update target group IDs. Upon receipt of the request, the cache management servers 105 update the print document information (cache) 307.

Figure 7:
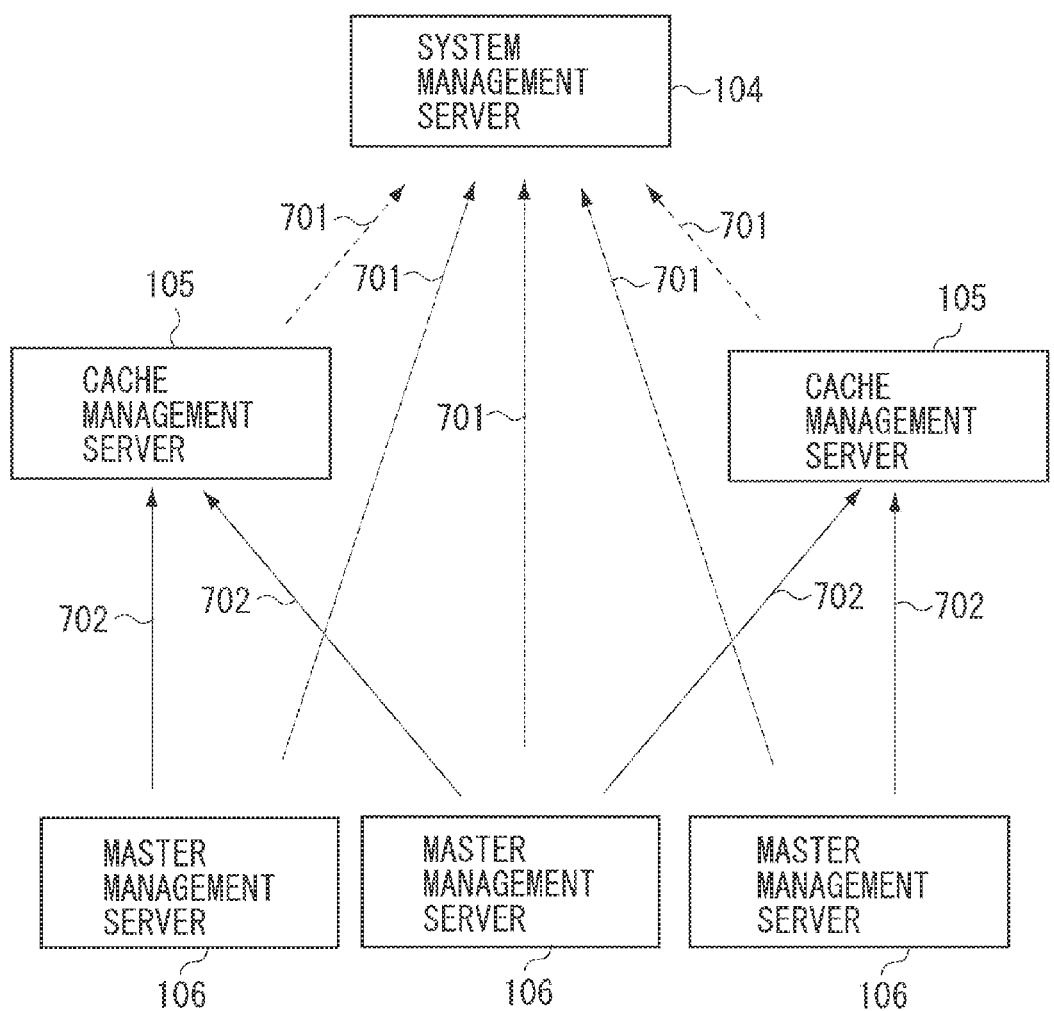
FIG. 7 illustrates a process flow when the master management server and the cache management server acquire a disposal reference date from the system management server and perform disposal processing.

FIG. 7 illustrates a process flow when the master management servers 106 and the cache management servers 105 acquire a disposal reference date from the system management server 104 and perform disposal processing. The master management servers 106 and the cache management servers 105 provide a live-status confirmation 701 to the system management server 104 at regular time intervals to acquire a disposal reference date. When the disposal reference date acquired from the system management server 104 differs from an executed disposal reference date retained in each server, each server performs disposal processing. After the disposal processing, each master management server 106 provides notification (a cache update request 702) regarding print document information for which disposal processing has been suspended, to all cache management servers 105 managing the cache for the group IDs contained in that print document information. The "disposal processing", as used herein, means processing for disposing of print documents. Examples of the disposal processing include processing for deleting print document information whose storage expiration date has passed, and processing for setting print document information whose printable expiration date has passed as a non-target for printing (i.e., as a non-printable document).

Figure 8:
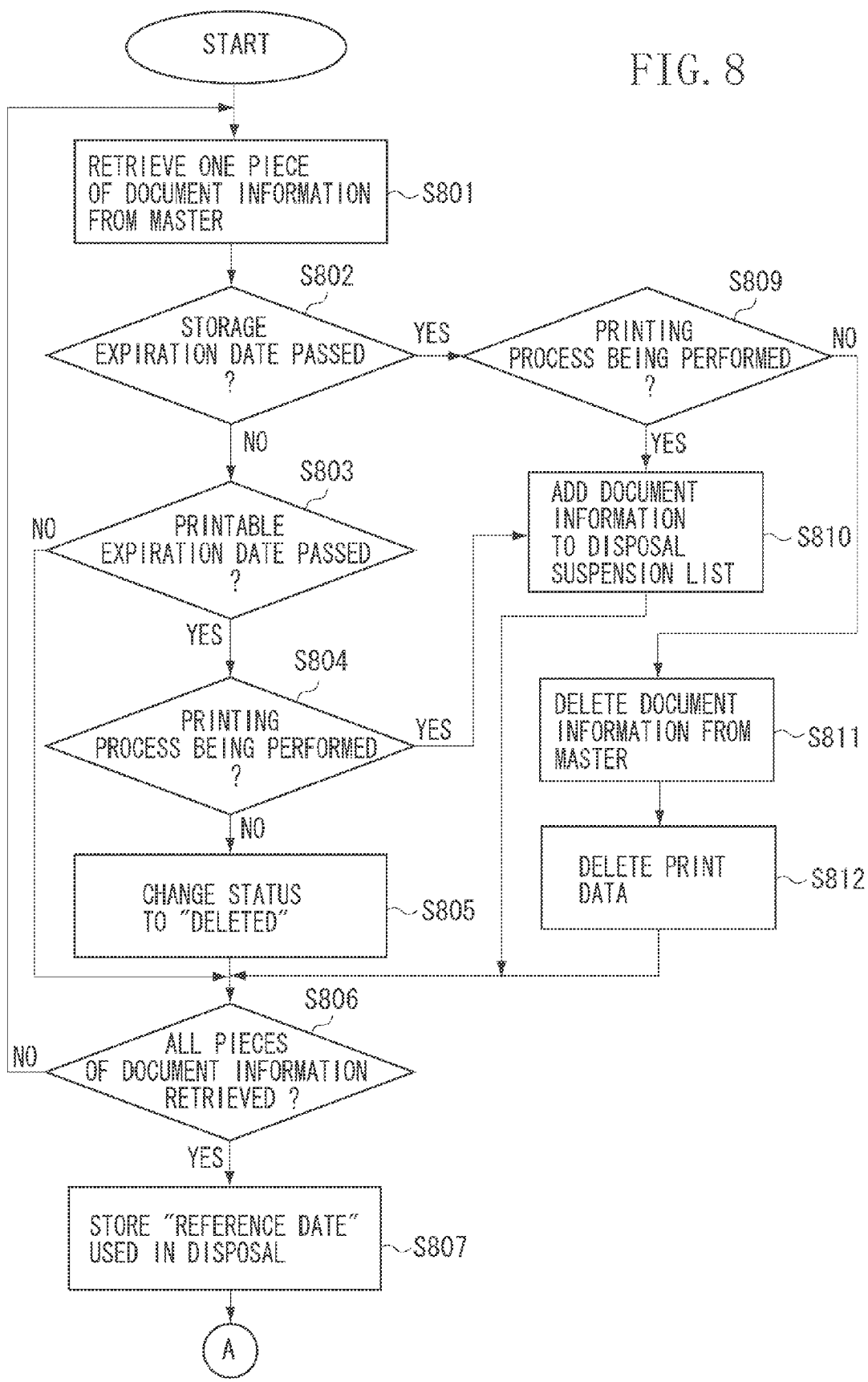
FIG. 8 is a flowchart illustrating the flow of disposal processing performed by the master management server.
Figure 9:
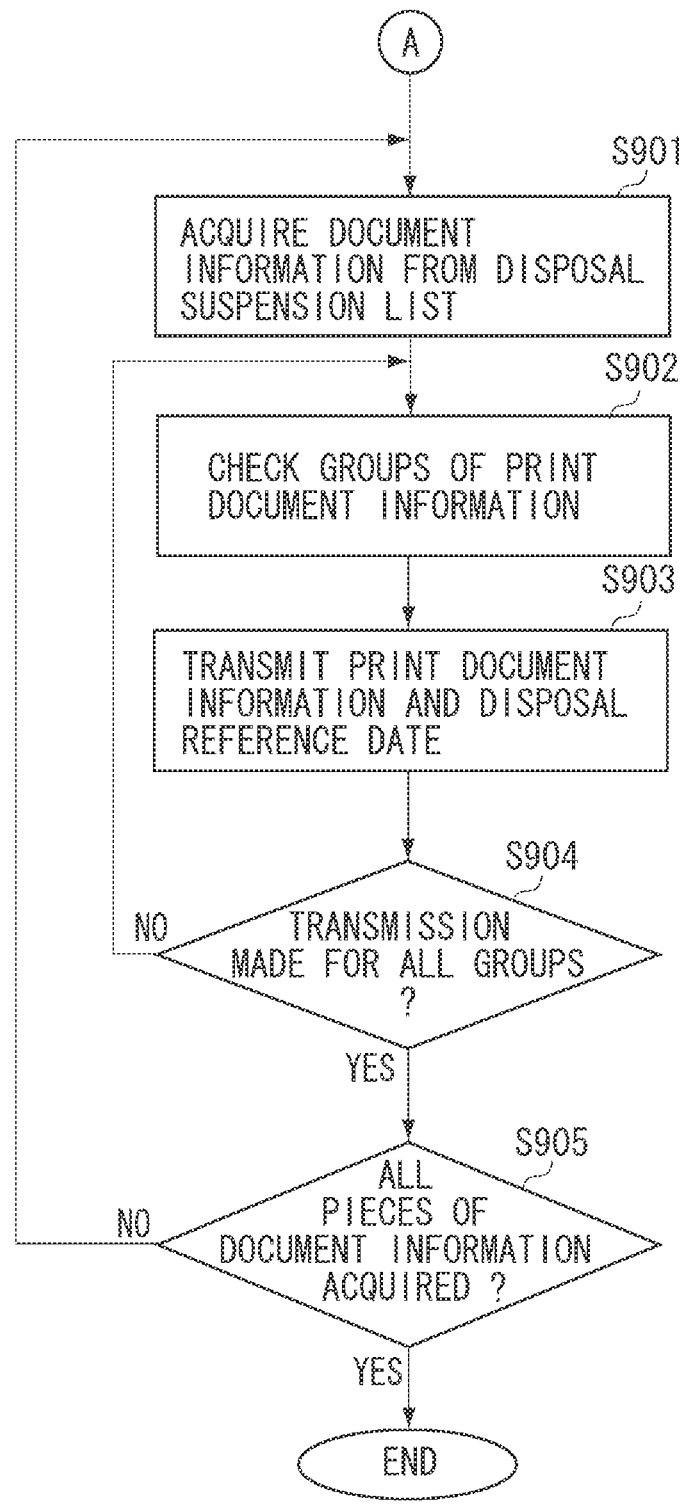
FIG. 9 is a flowchart illustrating the flow of disposal processing performed by the master management server.

FIGS. 8 and 9 are flowcharts illustrating the flow of disposal processing performed by each master management server 106 in the process flow of FIG. 7. The program of the master management servers 106 associated with this flow is stored in the hard disk 28 of the master management servers 106, and is read by the RAM 22 for execution by the CPU 21.

In the flowchart of FIG. 8, if it is determined that a disposal reference date acquired by the disposal reference date acquisition unit 310 from the system management server 104 differs from an executed disposal reference date retained in the master management server 106, the master management unit 309 performs disposal processing.

In step S801, the master management unit 309 retrieves one piece of print document information 401 from the print document information (master) 311. In step S802, the master management unit 309 determines whether the storage expiration date 405 of the retrieved print document information 401 is prior to a disposal reference date acquired from the system management server 104. If the master management unit 309 determines that the storage expiration date 405 is prior to the disposal reference date (YES in step S802), then in step S809, the master management unit 309 determines whether the status 403 of the print document information 401 is "printing". If the master management unit 309 determines that the status 403 is "printing" (YES in step S809), then in step S810, the master management unit 309 adds the print document information 401 to a disposal suspension list. The process proceeds to step S806.

If, in step S809, the master management unit 309 determines that the status 403 of the print document information 401 is not "printing" (NO in step S809), then in step S811, the master management unit 309 deletes the print document information 401 from the print document information (master) 311. In step S812, the master management unit 309 deletes print data that is stored in the network storage 108 and associated with the print document information 401. The process then proceeds to step S806.

If, in step S802, the master management unit 309 determines that the storage expiration date 405 of the retrieved print document information 401 is not prior to the disposal reference date (NO in step S802), the process proceeds to step S803. In step S803, the master management unit 309 determines whether the printable expiration date 404 of the retrieved print document information piece 401 is prior to the disposal reference date acquired from the system management server 104. If the master management unit 309 determines that the printable expiration date 404 is prior to the disposal reference date (YES in step S803), then in step S804, the master management unit 309 determines whether the status 403 of the print document information 401 is "printing".

If, in step S803, the master management unit 309 determines that the printable expiration date 404 of the retrieved print document information 401 is not prior to the disposal reference date acquired from the system management server 104 (NO in step S803), then the process proceeds to step S806. If, in step S804, the master management unit 309 determines that the status 403 of the print document information 401 is "printing" (YES in step S804), then the process proceeds to step S810. If, in step S804, the master management unit 309 determines that the status 403 of the print document information 401 is not "printing" (NO in step S804), then in step S805, the master management unit 309 changes the status 403 of the print document information 401 to "deleted" indicating "a non-printable document". The process then proceeds to step S806.

In step S806, the master management unit 309 determines whether the master management unit 309 has retrieved all pieces of print document information 401 from the print document information (master) 311. If the master management unit 309 determines that a piece(s) of print document information 401 that has not yet been retrieved remains in the print document information (master) 311 (NO in step S806), the master management unit 309 returns to step S801. If, in step S806, the master management unit 309 determines that the master management unit 309 has retrieved all pieces of print document information 401 (YES in step S806), then in step S807, the master management unit 309 stores the disposal reference date acquired from the system management server 104 and used in the disposal processing.

In step S901, the master management unit 309 acquires print document information 401 from the disposal suspension list. In step S902, the master management unit 309 checks group IDs 407 in the print document information 401. In step S903, the master management unit 309 transmits a cache update request 702 to cache management servers 105 managing print document information (cache) 307 having the group IDs 407. The cache update request 702 contains the print document information 401 and the disposal reference date.

In step S904, the master management unit 309 determines whether the master management unit 309 has transmitted the cache update request 702 to the cache management servers 105 corresponding to all group IDs contained in the print document information 401. If the master management unit 309 determines that there is a cache management server (s) 105 to which the master management unit 309 has not yet transmitted the cache update request 702 (NO in step S904), then the master management unit 309 returns to step S902. If, in step S904, the master management unit 309 determines that the master management unit 309 has transmitted the cache update request 702 to the cache management servers 105 corresponding to all group IDs (YES in step S904), then the process proceeds to step S905.

In step S905, the master management unit 309 determines whether the master management unit 309 has acquired all pieces of print document information 401 from the disposal suspension list. If, in step S905, the master management unit 309 determines that there is a piece(s) of print document information 401 left in the disposal suspension list (NO in step S905), the master management unit 309 returns to step S901. If, in step S905, the master management unit 309 determines that there are no print document information pieces 401 left in the disposal suspension list (YES in step S905), then the processing illustrated in FIGS. 8 and 9 ends.

Figure 10:
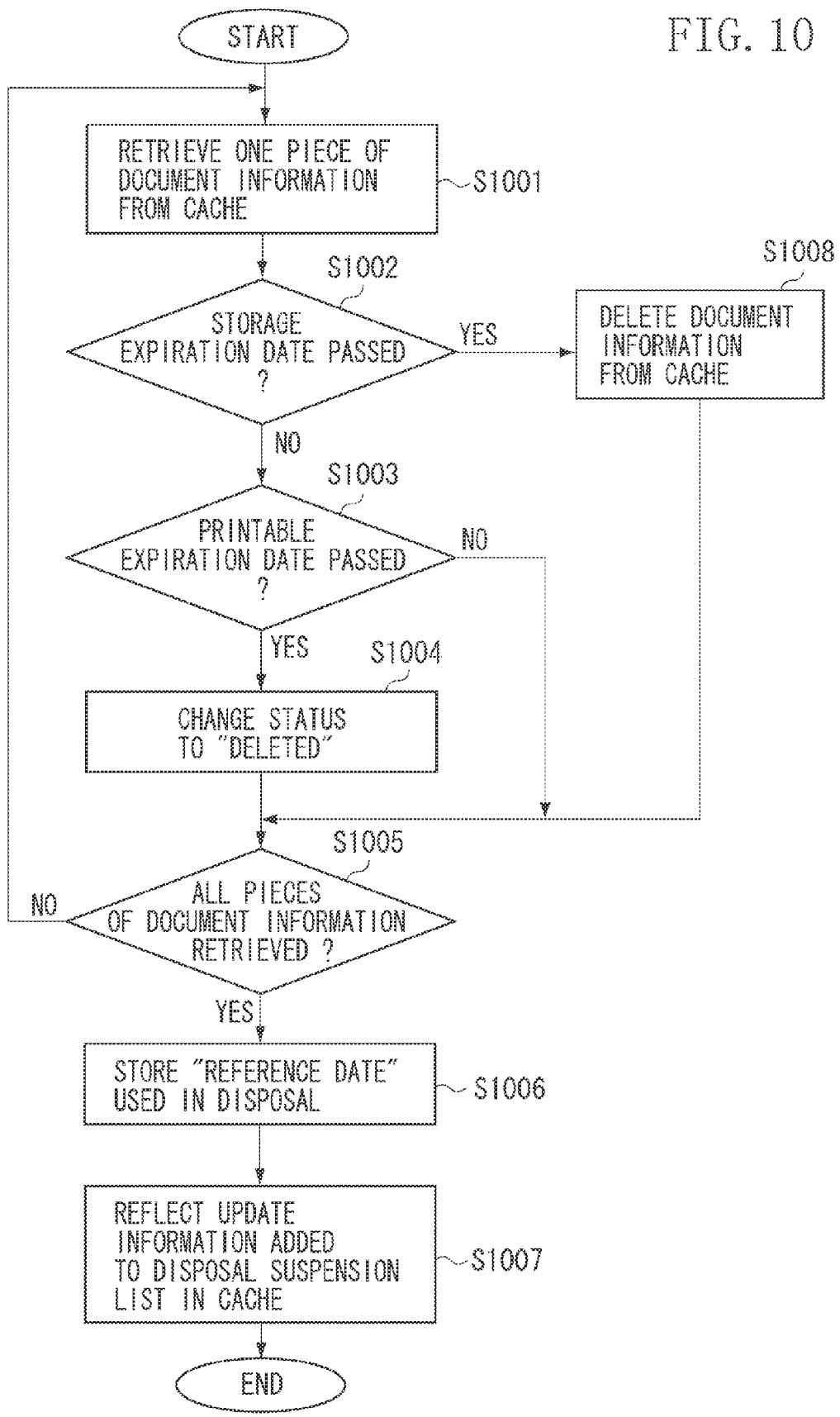
FIG. 10 is a flowchart illustrating the flow of disposal processing performed by the cache management server.

FIG. 10 is a flowchart illustrating the flow of disposal processing performed by each cache management server 105 in the process flow of FIG. 7. The program of the cache management servers 105 associated with this flow is stored in the hard disk 28 of the cache management servers 105, and is read by the RAM 22 for execution by the CPU 21.

In the flowchart of FIG. 10, the cache management unit 305 performs disposal processing when the cache management unit 305 determines that a disposal reference date acquired by the disposal reference date acquisition unit 306 from the system management server 104 differs from an executed disposal reference date retained in the cache management server 105.

In step S1001, the cache management unit 305 retrieves one piece of print document information 401 from the print document information (cache) 307. In step S1002, the cache management unit 305 determines whether the storage expiration date 405 of the retrieved print document information piece 401 is prior to a disposal reference date acquired from the system management server 104. If the cache management unit 305 determines that the storage expiration date 405 is prior to the disposal reference date (YES in step S102), then in step S1008, the cache management unit 305 deletes the print document information 401 from the print document information (cache) 307. The process proceeds to step S1005. If, in step S1002, the cache management unit 305 determines that the storage expiration date 405 of the retrieved print document information 401 is not prior to the disposal reference date (NO in step S1002), the process proceeds to step S1003.

In step S1003, the cache management unit 305 determines whether the printable expiration date 404 of the retrieved print document information 401 is prior to the disposal reference date acquired from the system management server 104. If the cache management unit 305 determines that the printable expiration date 404 is prior to the disposal reference date (YES in step S1003), then in step S1004, the cache management unit 305 changes the status 403 of the print document information 401 to "deleted". The process proceeds to step S1005. If, in step S1003, the cache management unit 305 determines that the printable expiration date 404 of the retrieved print document information 401 is not prior to the disposal reference date acquired from the system management server 104 (NO in step S1003), the process proceeds to step S1005.

In step S1005, the cache management unit 305 determines whether the cache management unit 305 has retrieved all pieces of print document information 401 from the print document information (cache) 307. If the cache management unit 305 determines that a piece(s) of print document information 401 that the cache management unit 305 has not yet retrieved is left in the print document information (cache) 307 (NO in step S1005), the cache management unit 305 returns to step S1001. If, in step S1005, if the cache management unit 305 determines that the cache management unit 305 has retrieved all pieces of print document information 401 (YES in step S1005), then in step S1006, the cache management unit 305 stores the disposal reference date acquired from the system management server 104 and used in the disposal processing. In step S1007, the cache management unit 305 307 reflects update information provided from the master management server 106 and added to the disposal suspension list in the print document information (cache). This completes the processing illustrated in FIG. 10.

Figure 11:
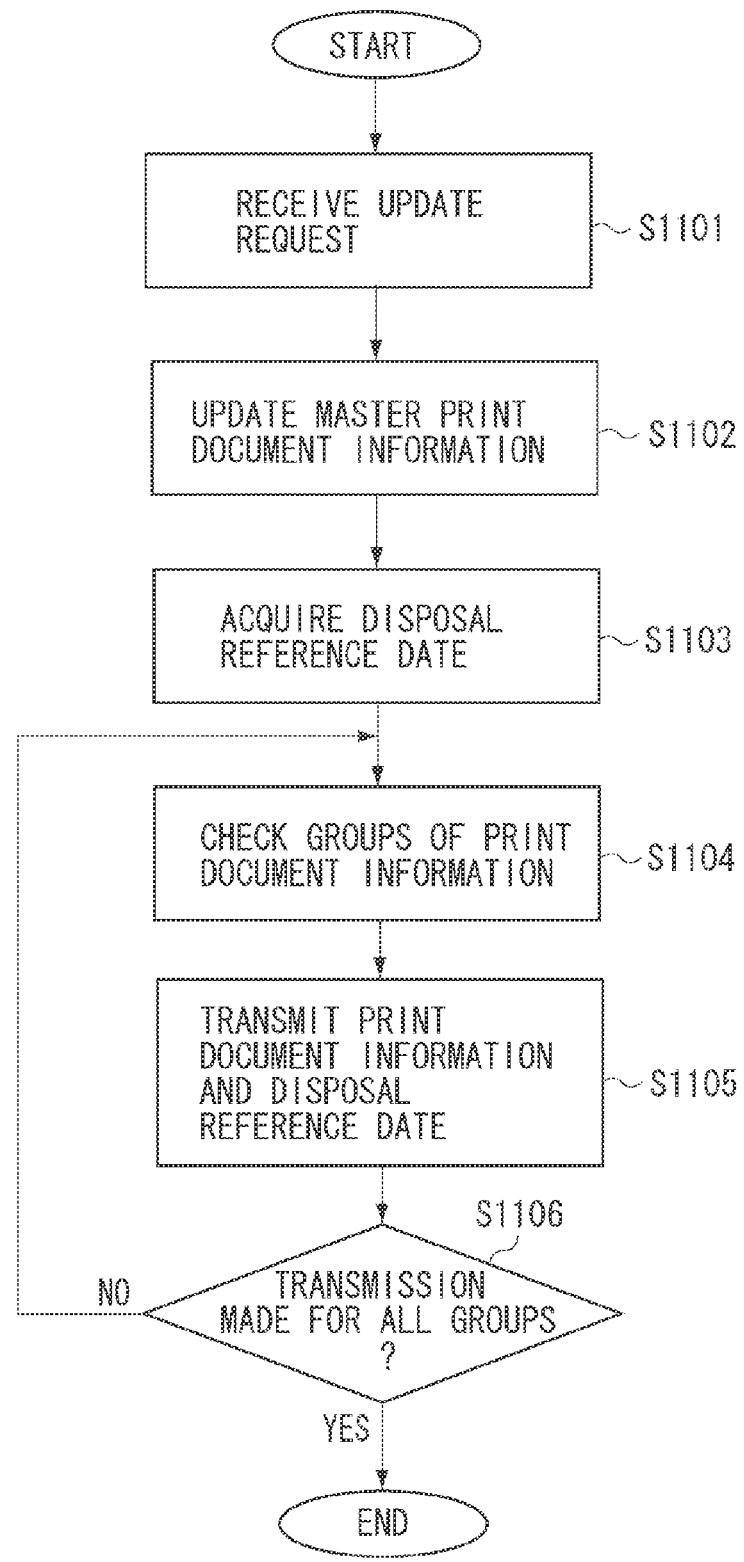
FIG. 11 is a flowchart illustrating the flow of processing performed by the master management server when the master management server receives an update request.

FIG. 11 is a flowchart illustrating the flow of processing performed by the master management server 106 when the master management server 106 receives the update request 602 in the process flow of FIG. 6. The program of the master management servers 106 associated with this flow is stored in the hard disk 28 of the master management servers 106, and is read by the RAM 22 for execution by the CPU 21.

In the flowchart of FIG. 11, in step S1101, the request processing unit 308 in the master management server 106 receives the update request 602. In step S1102, the master management unit 309 updates print document information 401 having the print document ID 402 contained in the update request 602. In step S1103, the master management unit 309 acquires the disposal reference date stored in step S807 in FIG. 8. In step S1104, the master management unit 309 checks the group IDs 407 in the updated print document information 401. The process proceeds to step S1105. In step S1105, the master management unit 309 transmits the cache update request 601 to the cache management servers 105 managing the print document information (cache) 307 having the group IDs 407. The cache update request 601 contains the print document information 401 and the disposal reference date. In step S1106, the master management unit 309 determines whether the master management unit 309 has transmitted the cache update request 601 for all group IDs 407 contained in the updated print document information 401. If not (NO in step S1106), the process returns to step S1104. If, in step S1106, the master management unit 309 determines that the master management unit 309 has transmitted the cache update request 601 for all group IDs 407 (YES in step S1106), then the processing illustrated in FIG. 11 ends.

Figure 12:
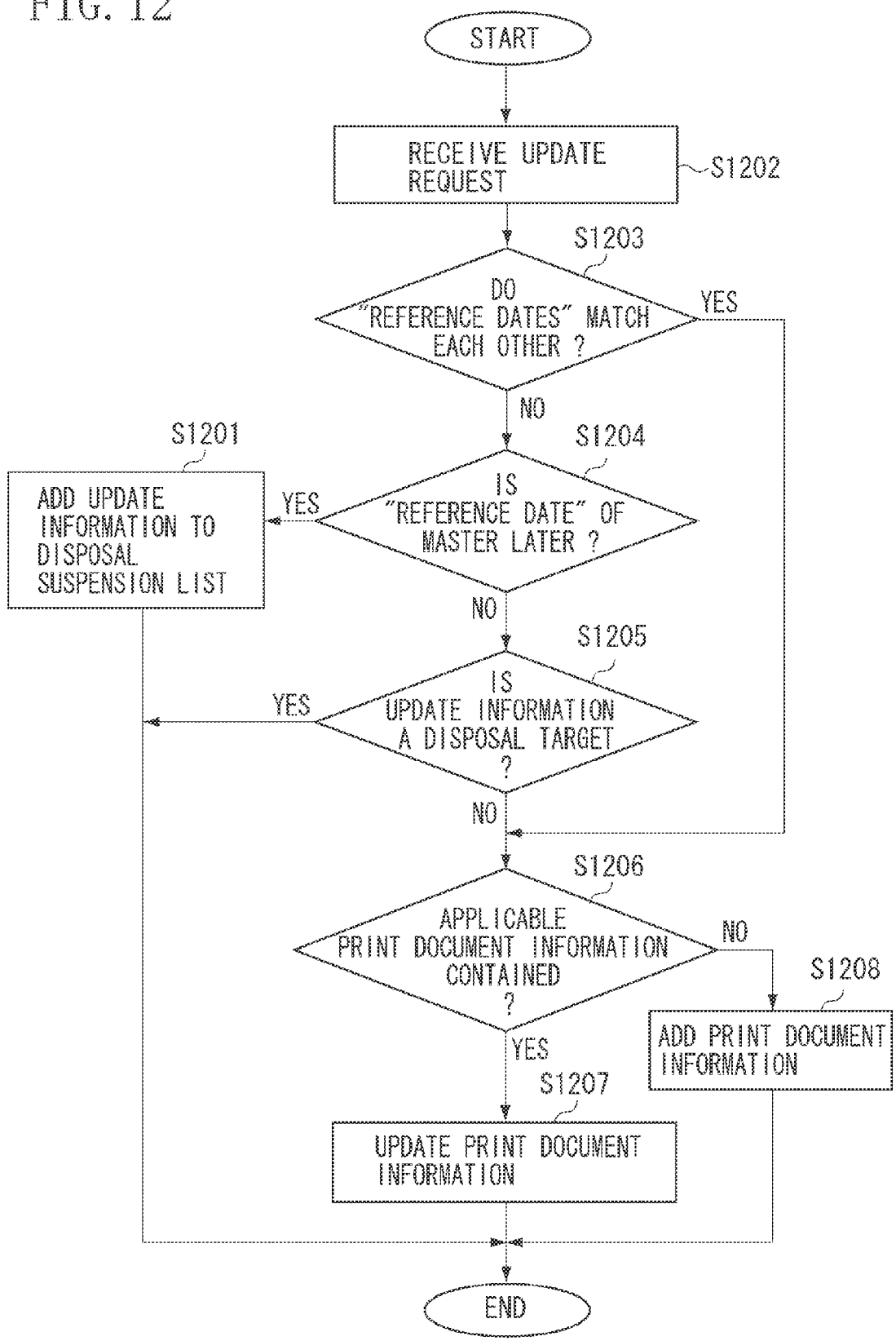
FIG. 12 is a flowchart illustrating the flow of processing performed by the cache management server when the cache management server receives an update request.

FIG. 12 is a flowchart illustrating the flow of processing performed by each cache management server 105 when the cache management server 105 receives the cache update request 601 in the process flow of FIG. 6 or the cache update request 702 in the process flow of FIG. 7. The program of the cache management servers 105 associated with this flow is stored in the hard disk 28 of the cache management servers 105, and is read by the RAM 22 for execution by the CPU 21.

In the flowchart of FIG. 12, in step S1202, the request processing unit 304 of the cache management server 105 receives the cache update request 601 or 702. In step S1203, the cache management unit 305 determines whether the disposal reference date contained in the update request matches the disposal reference date stored in step S1006 in FIG. 10. If, in step S1203, the cache management unit 305 determines that the disposal reference dates match each other (YES in step S1203), the process proceeds to step S1206. If, in step S1203, the cache management unit 305 determines that the disposal reference dates do not match each other (NO in step S1203), then in step S1204, the cache management unit 305 determines whether the disposal reference date contained in the update request is later than the disposal reference date stored in step S1006. If, in step S1204, the cache management unit 305 determines that the disposal reference date contained in the update request is later than the disposal reference date stored in step S1006 (YES in step S1204), then in step S1201, the cache management unit 305 adds the print document information piece(s) 401 contained in the update request to the disposal suspension list. This completes the processing illustrated in FIG. 12.

If, in step S1204, the cache management unit 305 determines that the disposal reference date contained in the update request is not later than the disposal reference date stored in step S1006 (NO in step S1204), the process proceeds to step S1205. In step S1205, the cache management unit 305 determines whether the printable expiration date 404 or storage expiration date 405 of the print document information piece(s) 401 contained in the update request is prior to the disposal reference date stored in step S1006 in FIG. 10 (that is, whether the print document information piece(s) 401 is a disposal target). If, in step S1205, the cache management unit 305 determines that the printable expiration date 404 or storage expiration date 405 is prior to the disposal reference date (YES in step S1205), the processing illustrated in FIG. 12 ends.

If, in step S1205, the cache management unit 305 determines that the printable expiration date 404 or storage expiration date 405 is not prior to the disposal reference date (NO in step S1205), the process proceeds to step S1206. In step S1206, the cache management unit 305 determines whether the print document information (cache) 307 contains print document information 401 that matches the print document ID (s) 402 of the print document information piece(s) 401 contained in the update request. If, in step S1206, the cache management unit 305 determines that the print document information (cache) 307 contains such print document information 401 (YES in step S1206), then in step S1207, the cache management unit 305 updates the print document information (cache) 307 with the print document information 401 contained in the update request. This completes the processing illustrated in FIG. 12. If in step S1206 the cache management unit 305 determines that the print document information (cache) 307 does not contain such print document information 401 (NO in step S1206), the cache management unit 305 adds the print document information 401 contained in the update request to the print document information (cache) 307. This completes the processing illustrated in FIG. 12.

FIGS. 13 to 16 illustrate examples of changes in the print document information (master) 311 and in the print document information (cache) 307 before and after disposal processing.

Figure 13:
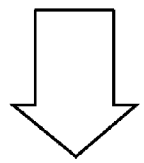
FIG. 13 illustrates changes in the print document information (master) before and after disposal processing.

FIG. 13 illustrates changes in the print document information (master) 311 before and after disposal processing. Print document information (master) 1301 shows the state before disposal processing. Print document information (master) 1302 shows the state after disposal processing is performed on the print document information (master) 1301 with Nov. 10, 2009 set as the disposal reference date.

When disposal processing is performed on the pre-disposal-processing print document information (master) 1301 with Nov. 10, 2009 set as the disposal reference date, a document 1 whose storage expiration date has passed is deleted (in step S811 in FIG. 8). The status 403 of a document 3 whose printable expiration date has passed is also changed to "deleted" (in step S805 in FIG. 8). For a document 2 whose storage expiration date has passed, and a document 4 whose printable expiration date has passed, the status 403 is "printing", and thus, disposal is suspended (in step S810 in FIG. 8). After the disposal processing, the master management unit 309 transmits a cache update request 702 to cache management servers 105 (in step S903 in FIG. 9). The cache update request 702 contains the print document information 401 of the documents 2 and 4, for which disposal processing has been suspended, and the disposal reference date, i.e., Nov. 10, 2009.

FIG. 14 illustrates changes in the print document information (cache) 307 before and after disposal processing with respect to the print document information (master) 311 illustrated in FIG. 13. Print document information (cache) 1401 shows the state before disposal processing. Print document information (cache) 1402 shows the state after disposal processing is performed on the print document information (cache) 1401 with Nov. 10, 2009 set as the disposal reference date.

When disposal processing is performed on the pre-disposal-processing print document information (cache) 1401 with Nov. 10, 2009 set as the disposal reference date, documents 1 and 2 whose storage expiration date has passed are deleted (in step S1008 in FIG. 10). The status 403 of documents 3 and 4 whose printable expiration date has passed is also changed to "deleted" (in step S1004 in FIG. 10).

Print document information (cache) 1403 shows the result of reflecting, in the print document information (cache) 1402, the print document information 401 contained in the update request provided from the master management server 106. If, after the disposal processing by the cache management server 105, the cache management server 105 receives the cache update request 702 made after the disposal processing performed by the master management server 106, the disposal reference date, i.e., Nov. 10, 2009, contained in the cache update request 702 matches the disposal reference date, i.e., Nov. 10, 2009, retained in the cache management server 105. In this case, the print document information 401 contained in the cache update request 702 is reflected in the print document information (cache) 307. The cache update request 702 provided from the master management server 106 contains the print document information 401 of the documents 2 and 4 for which disposal has been suspended in the master management server 106. The print document information (cache) 1403 shows the result of reflecting the print document information 401 in the print document information (cache) 1402 (in steps S1207 and S1208 in FIG. 12).

If, before the disposal processing by the cache management server 105, the cache management server 105 receives the cache update request 702 made after the disposal processing performed by the master management server 106, the disposal reference date contained in the cache update request 702 is later than the disposal reference date retained in the cache management server 105. That is, the disposal reference date, i.e., Nov. 10, 2009, contained in the cache update request 702 is later than the disposal reference date, i.e., Nov. 9, 2009, retained in the cache management server 105. In this case, the print document information 401 contained in the cache update request 702 is stored in the update suspension list, and after the disposal processing by the cache management server 105, the print document information 401 is reflected in the print document information (cache) 1402. Specifically, the print document information 401 of the documents 2 and 4 contained in the cache update request 702 provided from the master management server 106 is stored in the update suspension list (in step S1201 in FIG. 12). The print document information 401 is then reflected in the post-disposal-processing print document information (cache) 1402 (in step S1007 in FIG. 10), resulting in the print document information (cache) 1403. The print document information (cache) 1403 matches the print document information (master) 1302, thus achieving synchronization.

FIG. 15 illustrates changes in the print document information (master) 311 when disposal processing is performed on the print document information (master) 311 after user operation. Print document information (master) 1502 shows the state after printing of a document 4 in print document information (master) 1501 is aborted and printing of a document 5 therein is performed according to user operation. As compared with the print document information (master) 1501, the status 403 of the document 4 is changed to "cancelled", and the status 403 of the document 5 is changed to "printing". At this time, a cache update request 601 is transmitted to the cache management servers 105. The cache update request 601 contains the print document information 401 of the documents 4 and 5 and the disposal reference date, i.e., Nov. 9, 2009.

Print document information (master) 1503 shows the state after disposal processing is performed on the print document information (master) 1502 with Nov. 10, 2009 set as the disposal reference date. When disposal processing is performed on the pre-disposal-processing print document information (master) 1502 with Nov. 10, 2009 set as the disposal reference date, a document 1 whose storage expiration date has passed is deleted (in step S811 in FIG. 8). The status 403 of a document 3 whose printable expiration date has passed is also changed to "deleted" (in step S805 in FIG. 8). For a document 2 whose storage expiration date has passed, the status 403 is "printing", and thus, disposal processing is suspended (in step S810 in FIG. 8). After the disposal processing, the cache update request 702 is transmitted to the cache management servers 105 (in step S903 in FIG. 9). The cache update request 702 contains the print document information 401 of the document 2 for which disposal processing has been suspended, and the disposal reference date, i.e., Nov. 10, 2009.

FIG. 16 illustrates changes in the print document information (cache) 307 with respect to the print document information (master) 311 illustrated in FIG. 15 before and after disposal processing and when the update requests from the master management server 106 are reflected. Print document information (cache) 1602 shows the state after disposal processing is performed on pre-disposal-processing print document information (cache) 1601 with Nov. 10, 2009 set as the disposal reference date. When disposal processing is performed on the pre-disposal-processing print document information (cache) 1601 with Nov. 10, 2009 set as the disposal reference date, documents 1 and 2 whose storage expiration date has passed are deleted (in step S1008 in FIG. 10). The status 403 of documents 3 and 4 whose printable expiration date has passed is also changed to "deleted" (in step S1004 in FIG. 10).

Print document information (cache) 1603 shows the result of reflecting, in the print document information (cache) 1602, the print document information 401 contained in the cache update request 601 provided from the master management server 106 according to the user operation. The disposal reference date, i.e., Nov. 9, 2009, contained in the update request is earlier than the disposal reference date, i.e., Nov. 10, 2009, retained in the cache management server 105. Thus, it is checked whether the print document information 401 contained in the update request is a disposal target (in step S1205 in FIG. 12). The document 4 is a disposal target subjected to disposal processing performed with the disposal reference date, i.e., Nov. 10, 2009, retained in the cache management server 105. Hence, the document 4 is not reflected in the print document information (cache) 1602. The document 5 is not a disposal target, and is thus reflected in the print document information (cache) 1602 (in step S1207 in FIG. 12), resulting in print document information (cache) 1603.

Print document information (cache) 1604 shows the result of reflecting, in the print document information (cache) 1603, the print document information 401 contained in the cache update request 702 provided from the master management server 106 as a result of the disposal processing. The disposal reference date, i.e., Nov. 10, 2009, contained in the update request matches the disposal reference date, i.e., Nov. 10, 2009, retained in the cache management server 105. Thus, the print document information 401 of the document 2 contained in the update request is reflected in the print document information (cache) 1603 (in step S1208 in FIG. 12), resulting in the print document information (cache) 1604. The print document information (cache) 1604 matches the print document information (master) 1503, thus achieving synchronization.

As described above, the present exemplary embodiment enables efficient and consistent disposal processing on print documents whose expiration date has passed, while reducing the load on the entire system. The present exemplary embodiment also enables efficient and consistent disposal processing on print documents whose storage expiration date has passed, while reducing the load on the entire system. The present exemplary embodiment also enables efficient and consistent disposal processing on print documents whose printable expiration date has passed, while reducing the load on the entire system.

Aspects of the present invention can also be realized by a computer of a system or apparatus (or devices such as a CPU or MPU) that reads out and executes a computer-executable process recorded on a computer-readable medium to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-279728 filed Dec. 9, 2009, which is hereby incorporated by reference herein in its entirety.

What is claimed is:

1. A master management server for managing print document information in a master, the master management server comprising:
    an acquisition unit configured to acquire a disposal reference date from a system management server for managing a date used as a reference date in disposal processing of print document information; and
    a master management unit configured to, if the disposal reference date acquired by the acquisition unit differs from an executed disposal reference date retained in the master management server, perform disposal processing in which print document information is deleted or is set as a non-target for printing, based on the disposal reference date acquired by the acquisition unit, and transmit a cache update request, containing print document information for which disposal has been suspended in the disposal processing and the disposal reference date used in the disposal processing, to a cache management server for managing cache of a group identified by group identification information contained in the print document information.

2. The master management server according to claim 1, wherein if the disposal reference date acquired by the acquisition unit differs from the executed disposal reference date retained in the master management server, the master management unit performs print-document-information disposal processing in which print document information that is contained in the master and whose storage expiration date has passed is deleted, based on the disposal reference date acquired by the acquisition unit.

3. The master management server according to claim 1, wherein if the disposal reference date acquired by the acquisition unit differs from the executed disposal reference date retained in the master management server, the master management unit performs print-document-information disposal processing in which print document information that is contained in the master and whose printable expiration date has passed is set as a non-printable document, based on the disposal reference date acquired by the acquisition unit.

4. A cache management server for managing print document information in a cache, the cache management server comprising:
    an acquisition unit configured to acquire a disposal reference date from a system management server for managing a date used as a reference date in disposal processing of print document information; and
    a cache management unit configured to, if the disposal reference date acquired by the acquisition unit differs from an executed disposal reference date retained in the cache management server, perform disposal processing in which print document information is deleted or is set as a non-target for printing, based on the disposal reference date acquired by the acquisition unit, and upon receipt of a cache update request containing print document information and a disposal reference date from a master management server for managing print document information in a master, compare the disposal reference date contained in the cache update request with the disposal reference date used in the disposal processing, and depending on a result of the comparison, determine whether to reflect the print document information contained in the cache update request in print document information in the cache managed by the cache management server.

5. The cache management server according to claim 4, wherein if the disposal reference date acquired by the acquisition unit differs from the executed disposal reference date retained in the cache management server, the cache management unit performs print-document-information disposal processing in which print document information that is contained in the cache and whose storage expiration date has passed is deleted, based on the disposal reference date acquired by the acquisition unit.

6. The cache management server according to claim 4, wherein if the disposal reference date acquired by the acquisition unit differs from the executed disposal reference date retained in the cache management server, the cache management unit performs print-document-information disposal processing in which print document information that is contained in the cache and whose printable expiration date has passed is set as a non-printable document, based on the disposal reference date acquired by the acquisition unit.

7. The cache management server according to claim 6, wherein if the disposal reference date contained in the cache update request matches the disposal reference date used in the disposal processing, the cache management unit determines to reflect the print document information contained in the cache update request in the print document information in the cache managed by the cache management server;

if the disposal reference date contained in the cache update request is later than the disposal reference date used in the disposal processing, the cache management unit determines to suspend reflecting the print document information contained in the cache update request in the print document information in the cache managed by the cache management server; and if the disposal reference date contained in the cache update request is not later than the disposal reference date used in the disposal processing, and if an expiration date of the print document information contained in the cache update request indicates that that the print document information is not a target of disposal performed with the disposal reference date used in the disposal processing, the cache management unit determines to reflect the print document information contained in the cache update request in the print document information in the cache managed by the cache management server.

8. A print document information management system comprising a system management server for managing a date used as a reference date in disposal processing of print document information, a master management server for managing print document information in a master, and a cache management server for managing print document information in a cache, wherein the master management server comprises:

a first acquisition unit configured to acquire the disposal reference date from the system management server; and a master management unit configured to, if the disposal reference date acquired by the first acquisition unit differs from an executed disposal reference date retained in the master management server, perform disposal processing in which print document information is deleted or is set as a non-target for printing, based on the disposal reference date acquired by the first acquisition unit, and transmit a cache update request, containing print document information for which disposal has been suspended in the disposal processing and the disposal reference date used in the disposal processing, to the cache management server for managing cache of a group identified by group identification information contained in the print document information, and wherein the cache management server includes:

a second acquisition unit configured to acquire the disposal reference date from the system management server, and a cache management unit configured to, if the disposal reference date acquired by the second acquisition unit differs from an executed disposal reference date retained in the cache management server, perform disposal processing in which print document information is deleted or is set as a non-target for printing, based on the disposal reference date acquired by the second acquisition unit, and upon receipt of the cache update request containing the print document information and the disposal reference date from the master management server for managing the print document information in the master, compare the disposal reference date contained in the cache update request with the disposal reference date used in the disposal processing performed by the cache management unit, and depending on a result of the comparison, determine whether to reflect the print document information contained in the cache update request in print document information in the cache managed by the cache management server.

9. A disposal processing method performed by a master management server for managing print document information in a master, the disposal processing method comprising:

acquiring a disposal reference date from a system management server for managing a date used as a reference date in disposal processing of print document information;

if the acquired disposal reference date differs from an executed disposal reference date retained in the master management server, performing disposal processing in which print document information is deleted or is set as a non-target for printing, based on the acquired disposal reference date; and transmitting a cache update request, containing print document information for which disposal has been suspended in the disposal processing and the disposal reference date used in the disposal processing, to a cache management server for managing cache of a group identified by group identification information contained in the print document information.

10. A disposal processing method performed by a cache management server for managing print document information in a cache, the disposal processing method comprising:

acquiring a disposal reference date from a system management server for managing a date used as a reference date in disposal processing of print document information;

if the acquired disposal reference date differs from an executed disposal reference date retained in the cache management server, performing disposal processing in which print document information is deleted or is set as a non-target for printing, based on the acquired disposal reference date; and upon receipt of a cache update request containing print document information and a disposal reference date from a master management server for managing print document information in a master, comparing the disposal reference date contained in the cache update request with the disposal reference date used in the disposal processing, and depending on a result of the comparison, determining whether to reflect the print document information contained in the cache update request in print document information in the cache managed by the cache management server.

11. A non-transitory computer-readable storage medium storing a computer-executable process for causing a computer to perform a method comprising:

acquiring a disposal reference date from a system management server for managing a date used as a reference date in disposal processing of print document information;

performing, if the acquired disposal reference date differs from an executed disposal reference date retained in a master management server, disposal processing in which print document information is deleted or is set as a non-target for printing, based on the acquired disposal reference date; and transmitting a cache update request, containing print document information for which disposal has been suspended in the disposal processing and the disposal reference date used in the disposal processing, to a cache management server for managing cache of a group identified by group identification information contained in the print document information.

12. A non-transitory computer-readable storage medium storing a computer-executable process for causing a computer to perform a method comprising:

acquiring a disposal reference date from a system management server for managing a date used as a reference date in disposal processing of print document information;

performing, if the acquired disposal reference date differs from an executed disposal reference date retained in a cache management server, disposal processing in which print document information is deleted or is set as a non-target for printing, based on the acquired disposal reference date; and upon receipt of a cache update request containing print document information and a disposal reference date from a master management server for managing print document information in a master, comparing the disposal reference date contained in the cache update request with the disposal reference date used in the disposal processing, and depending on a result of the comparison, determining whether to reflect the print document information contained in the cache update request in print document information in the cache managed by the cache management server.

\* \* \* \* \*